United States Patent [19]

Hanson

[11] Patent Number: 5,691,759

[45] Date of Patent: Nov. 25, 1997

[54] METHOD AND APPARATUS FOR INTERLEAVING RASTER SCAN LINES IN A MULTI-BEAM LASER IMAGING DEVICE

[75] Inventor: Gary Hanson, Meridian, Id.

[73] Assignee: Hewlett-Packard Company, Palo Alto, Calif.

[21] Appl. No.: 583,393

[22] Filed: Jan. 5, 1996

[51] Int. Cl.⁶ .................................................. B41J 2/47
[52] U.S. Cl. ........................ 347/233; 347/237; 395/111; 395/117
[58] Field of Search ........................ 347/237, 233, 347/241, 243, 232; 395/100, 101, 107, 109, 111, 115, 117

[56] References Cited

U.S. PATENT DOCUMENTS

| 4,905,025 | 2/1990 | Sakamoto et al. | 347/233 |
| 5,430,472 | 7/1995 | Curry | 347/232 |

*Primary Examiner*—Mark J. Reinhart

[57] ABSTRACT

A laser printer produces a raster image of plural scan lines of image pixels, each raster scan line separated from an adjacent raster scan line by a pitch distance p. The printer includes a movable photoreceptor and n laser sources, where $n \leq 2$. The laser sources produce n optical beams, separated by a distance of $(n+1)p$ in a direction of movement of the photoreceptor. A scanner scans the n optical beams in parallel paths across the photoreceptor as they are modulated in accordance with pixel data provided from an image buffer. Control circuitry modulates the n optical beams, respectively, with pixel values from one set of n raster scan lines. The n raster scan lines of the set are separated from each other by a distance of $(n+1)p$. At the completion of each scan, the photoreceptor is moved by a distance $(n \times p)$. The n optical beams are again modulated with pixel values from another set of n raster scan lines that are respectively, $(n+1)p$ distant from the n raster scan lines of the first set. In such manner, an interleaving of the scan lines is achieved, using plural optical beams from a laser diode chip to produce the n laser beams.

5 Claims, 4 Drawing Sheets

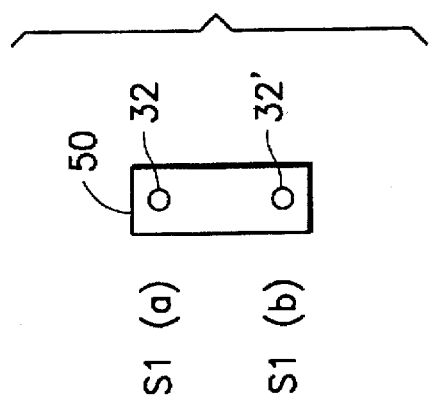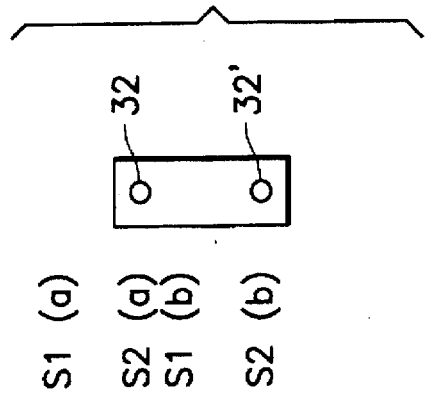
FIG. 3
FIG. 4

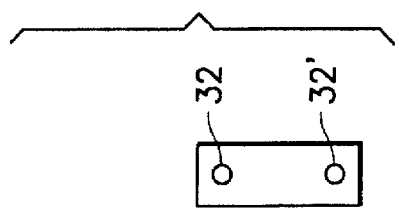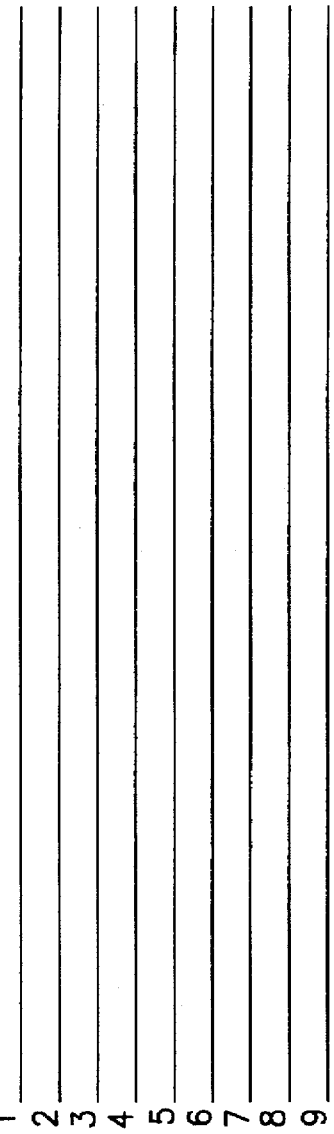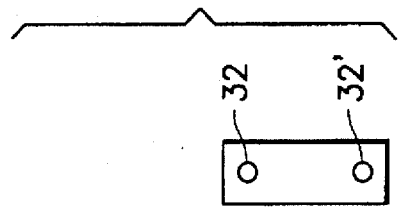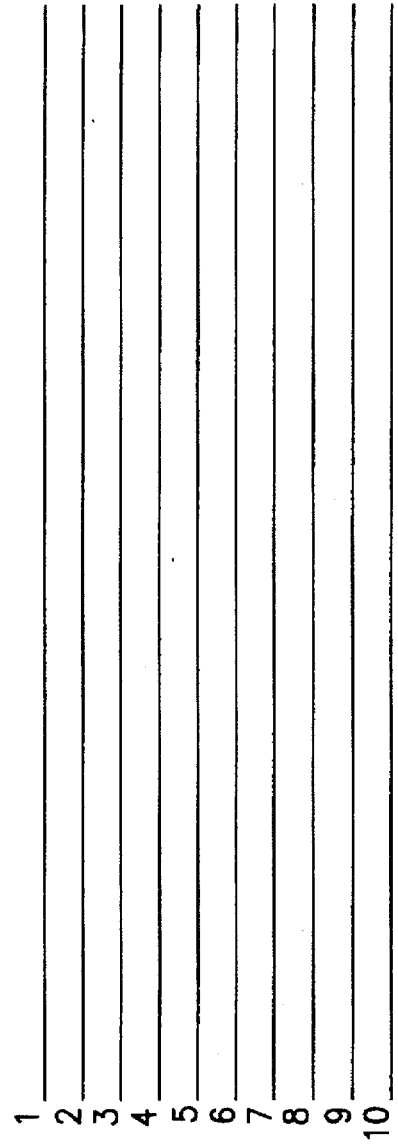

METHOD AND APPARATUS FOR INTERLEAVING RASTER SCAN LINES IN A MULTI-BEAM LASER IMAGING DEVICE

FIELD OF THE INVENTION

This invention relates to laser printers and copiers and, more particularly, to a method and apparatus for enabling a multi-beam laser copier/printer to print interleaved, plural raster scan lines without a need for complex beam steering optics.

BACKGROUND OF THE INVENTION

Laser printers and copiers are used with a wide variety of computer systems. Efforts are continually being made to increase the printing/copying speed of such devices while, at the same time, reducing their cost. Such a laser printer/copier scans a laser beam over the surface of a photoreceptor in a repetitive raster fashion, using a rotating polygonal mirror.

In order to increase the speed of operation of such a device, the prior art has attempted to use plural, concurrently scanned, laser beams to achieve a doubling of the exposure/print speed. Mochizuki et al. describe such a system in "Dual Beam Diode Laser Scanning System for High Speed Laser Beam Printers" Proceedings of the I, S and T Conference, Japan 1993, pages 222-225. To achieve their dual beam scan system, Mochizuki et al. employ isolated diode lasers. Their laser beams are fed through complex optical pathways to a scanning mirror. A rotationally asymmetric aspheric lens is employed to enable use of long wavelength diode lasers. The aspheric lens corrects degradation effects which result from asymmetric displacement of a reflection point from a mirror facet and further provides high magnification and a large numerical aperture. Such complex optical pathways and lenses add significant cost to the printer/copier.

Accordingly, it is an object of this invention to provide an improved method and apparatus for employing multiple beams to scan a photoreceptor in a laser imaging device.

It is another object of this invention to provide an improved multiple-beam, scanned laser imaging device wherein plural laser diode sources are utilized.

SUMMARY OF THE INVENTION

A laser printer produces a raster image of plural scan lines of image pixels, each raster scan line separated from an adjacent raster scan line by a pitch distance p. The printer includes a movable photoreceptor and n laser sources, where $n \leq 2$. The laser sources produce n optical beams, separated by a distance of $(n+1)p$ in a direction of movement of the photoreceptor. A scanner scans the n optical beams in parallel paths across the photoreceptor as they are modulated in accordance with pixel data provided from an image buffer. Control circuitry modulates the n optical beams, respectively, with pixel values from one set of n raster scan lines. The n raster scan lines of the set are separated from each other by a distance of $(n+1)p$. During a scan or at completion of a scan, the photoreceptor is moved by a distance $(n \times p)$. The n optical beams are again modulated with pixel values from another set of n raster scan lines that are respectively, $(n+1)p$ distant from the n raster scan lines of the first set. In such manner, an interleaving of the scan lines is achieved, using plural optical beams from a laser diode chip to produce the n laser beams.

DESCRIPTION OF THE DRAWINGS

FIGS. 3-6 show plural raster scan lines with a superimposed laser pair, and illustrate the relative movement therebetween which enables an interleaving of n scan lines on a photoreceptor.

DETAILED DESCRIPTION OF THE INVENTION

Figure 1:
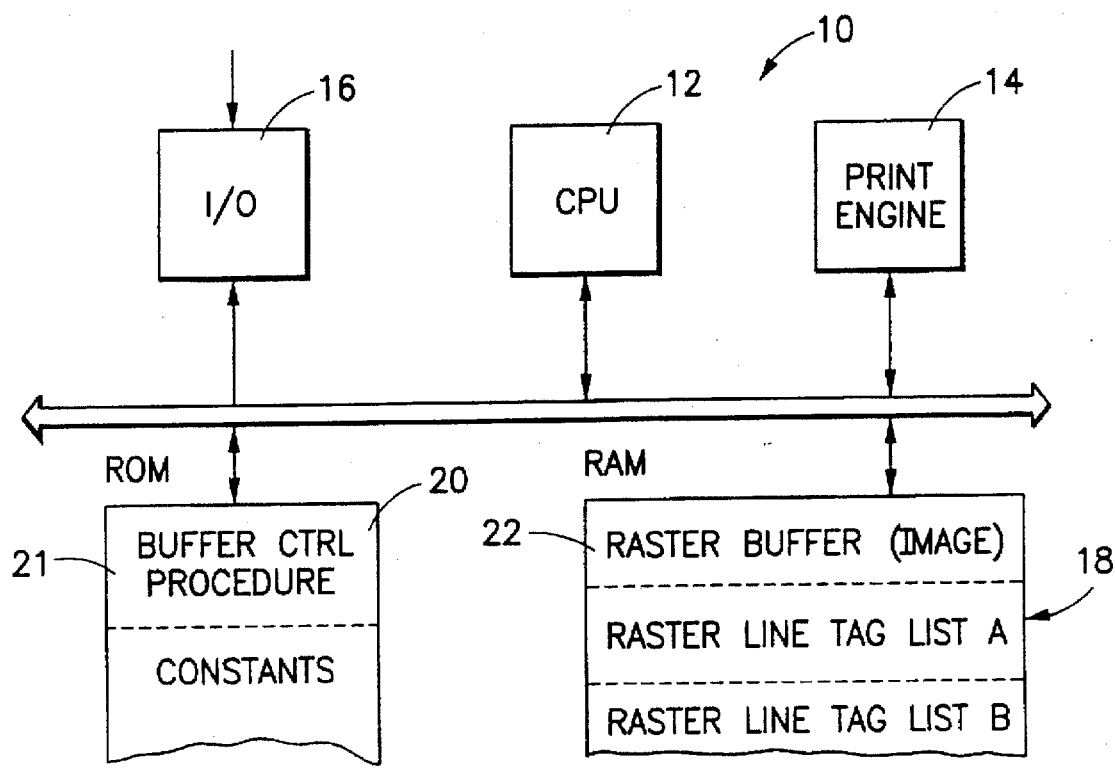
FIG. 1 is a block diagram of a printer system embodied to perform the invention hereof.

FIG. 1 is a high-level block diagram of a laser printer 10, including a central processing unit 12, a laser print engine 14 and an input/output module 16 for receiving image data from a host processor. Printer 10 further includes a random access memory (RAM) 18 and a read-only memory (ROM) 20. RAM 18 includes a portion which serves as a raster image buffer 22. As known to those skilled in the art, raster image buffer 22 stores plural raster lines of an image in the form of binary pixel values. Those pixel values, when fed to print engine 14, enable output of an image on a media sheet.

RAM 18 further includes raster line tag list A and raster line tag list B which are used by the invention to control which raster lines of the image modulate the plural imaging laser diodes included in print engine 14. ROM 20 includes a buffer control read-out procedure and further includes a set of constants which indicate the number of laser diodes present in print engine 14 and the physical arrangement thereof (to enable an adjustment of scan actions if one or more is offset from the beginning of a scan line).

Figures 1A, 2:
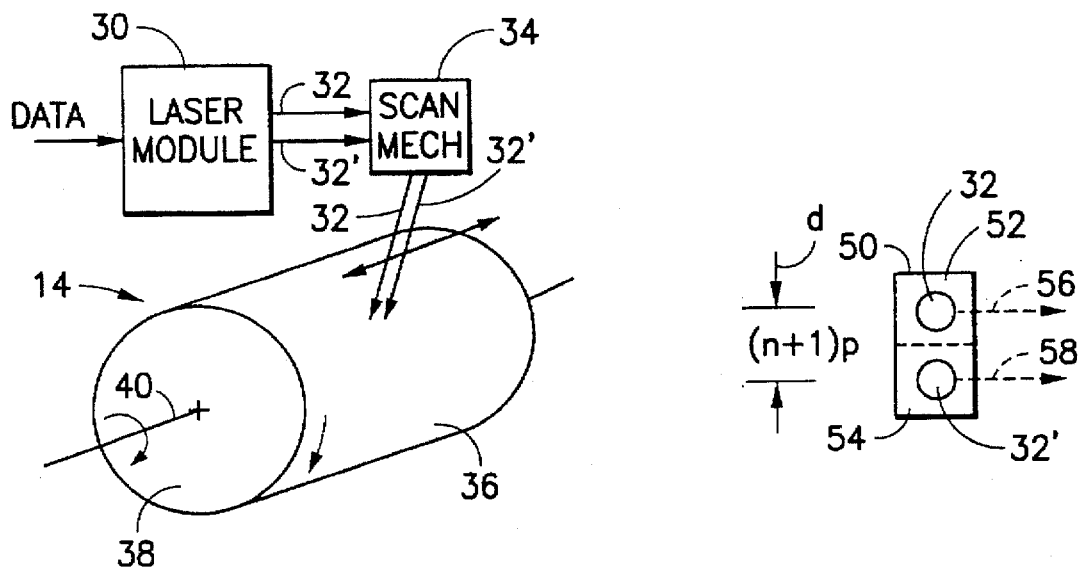
FIG. 1a is a more detailed block diagram of a laser print engine shown in block form in FIG. 1.
FIG. 2 illustrates a semiconductor chip having two devices for producing laser beams integrated thereinto.

FIG. 1a shows details of print engine 14 and illustrates a laser module 30 which outputs a plurality of laser beams 32, 32' that are modulated in accordance with input pixel data. Laser beams 32, 32' are directed at a scan mechanism 34 which, in the known manner, causes beams 32, 32' to be scanned across photoreceptor 36 on a drum 38. Motive means (not shown) are connected via a shaft 40 to drum 38 and enable movement thereof in a manner to be described below.

An arrangement of laser diodes for a dual laser beam scan system is shown in FIG. 2 and comprises a single semiconductor chip 50 which includes two laser diodes 52, 54 that emit laser beams 32 and 32'. Semiconductor chip 50 is shown schematically to illustrate the arrangement of laser beams 32 and 32' in relation to a scan direction (indicated by arrows 56 and 58, respectively). It is preferred that laser diodes 52 and 54 be positioned on a single chip 50 so that beams 32 and 32' are separated by a distance d that is a multiple of the pitch distance between adjacent raster scan lines. More specifically, laser beams 32 and 32' are separated by a distance $d=(n+1)p$, where: n is the number of laser beams and p is the pitch distance between raster scan lines on the surface of photoconductor 36.

If laser printer 10 is required to output print data at a resolution of 600 dots per inch, the pitch distance p between adjacent laser scan lines is approximately 1.5 mils. If a resolution of 300 dots per inch is desired, the distance between adjacent raster scan lines on photoreceptor 36 is approximately 3 mils. It is both difficult and expensive to construct a semiconductor chip which emits required power, adjacent laser beams, with center to center distances of approximately 1.5–3.0 mils. If, however, the laser beams are separated by a distance that is a multiple of the pitch distance between scan lines, the cost of a diode-containing chip becomes less and additional power is available, due to the larger semiconductor area that may be devoted to each diode structure. Assuming a 600 dpi resolution, the distance d is approximately $(2+1) \times 1.5$ mils=4.5 mils between laser beams 32 and 32'.

When such a laser diode structure is employed, the movement of drum 40 and data output from raster buffer 22 to print engine 14 must be controlled to enable all of the data from raster buffer 22 to be outputted in a manner to assure that all data is properly written by laser diodes 52, 54 onto photoreceptor 36.

To assure a proper sequencing of pixel data from raster buffer 22 to print engine 14, buffer control procedure 21 (in ROM 20) initially calculates which lines of the raster image will be fed to modulate laser diode 52 and which lines of the raster image will be fed to modulate laser diode 54.

As will become hereafter apparent, n+1 scans are required to fill all raster lines in a swath across photoreceptor 36. To achieve the n+1 scans, drum 38 is rotationally incremented, after each scan of laser beams 32, 32', by a distance (n×p) to cause a relative change in position between photoreceptor 36 and laser beams 32 and 32'.

This action will better be understood by referring to FIGS. 3–6 wherein nine raster scan lines on photoreceptor 36 are schematically illustrated and sequentially numbered. It is initially assumed that laser beams 32 and 32' are aligned to expose scan lines 1 and 4 (since laser beams 32 and 32' are separated by (n+1) or 3 raster scan lines). During a first scan S1, laser beam 32 is modulated with image pixel data that is to be imprinted along scan line 1, whereas laser beam 32' is modulated by image pixel data that is to appear on scan line 4.

From a previously performed calculation, each of the raster scan lines that is destined to be fed to laser diode 52 (so as to modulate laser beam 32) is listed in a raster line tag list A and each of the raster scan lines that is destined to be fed to laser diode 54 to modulate laser beam 32', is listed in raster line tag list B. Each time drum 38 is rotationally moved to change the relative position between the surface of photoreceptor 36 and laser beams 32, 32', a next pair of raster scan lines (one from raster line tag list A and one from raster line tag list B) are caused to modulate laser diodes 52, 54 and laser beams 32, 32'.

After the scan of raster lines 1 and 4 (in FIG. 3), the relative position between raster scan lines 1–9 on photoreceptor 36 and laser beams 32, 32' is moved by a distance (n×p) or two raster scan lines. This is accomplished by rotationally incrementing drum 38. Thus, laser beam 32 becomes aligned with raster scan line 3 and laser beam 32' becomes aligned with scan line 6. Then, during a second scan S2, a raster scan line of pixels (the one destined for scan line 3) is read out from raster buffer 18 under control of the next listed image raster line from raster line tag list A to modulate laser diode 52. At the same time, a raster scan line of pixels (the one destined for scan line 6) is read out from raster buffer 18 under control of the next listed image raster line from raster line tag list B to modulate laser diode 54. The modulated laser beams 32 and 32' are scanned across photoreceptor 36 to achieve an exposure of each of scan lines 3 and 6.

Next, as shown in FIG. 5, drum 38 is rotationally moved to reposition laser beams 32 and 32' into alignment with scan lines 5 and 8, respectively. Again, the respective image pixel lines to modulate laser beams 32 and 32' are determined from raster line tag lists A and B The determined image pixel line data is then fed to respective laser diodes 52, 54, causing scan lines 5 and 8 to be written on photoreceptor 36 as laser beams 32, 32' are concurrently scanned thereacross. The process continues, as shown in FIG. 6, until all of the image raster lines in raster buffer 22 have been written onto photoreceptor 36.

Note that in the example of FIGS. 3–6, scan line 2 is never exposed. This can be avoided if laser beams 32 and 32' are initially positioned up one scan line at the initiation of the page exposure action.

From the example shown in FIGS. 3–6, it can be seen, given knowledge of the number of concurrently scanned laser beams, that the raster line tag lists A and B can be readily determined. Then, by keeping track of a last image pixel line fed to a laser diode, a next raster line designated for that laser diode can be determined and outputted at the proper time.

Figure 7:
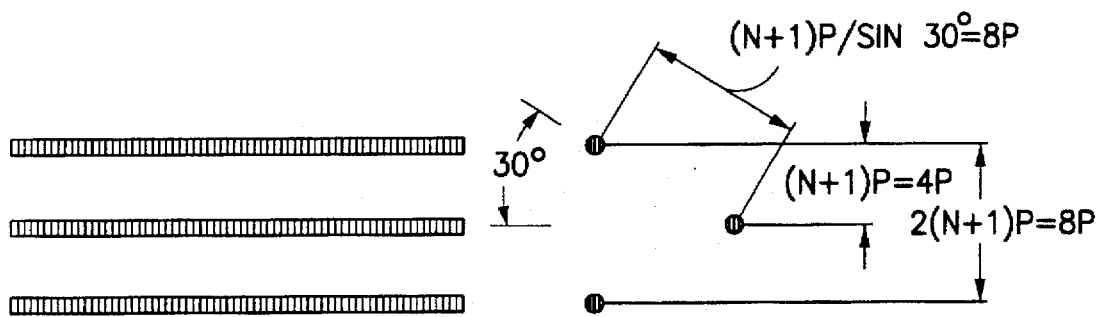
FIG. 7 is a schematic of three laser beams, showing the arrangement thereof to enable concurrent scanning in accord with the invention.

While the above example has shown the use of a pair of laser beams, the use of additional parallel scan beams is contemplated in this invention. In FIG. 7, a three beam system is illustrated, showing the required spacings between each of the beams. The vertical beam spacing is (n+1)p or 4p for the 3 beam array. In this orientation, the first to last beam spacing is 2(n+1)p. It follows that the side of an equilateral triangle is also 2(n+1)p or 8p. The rotated angle must be arcsin(n+1) or arcsin(½)=30°.

Figure 8:
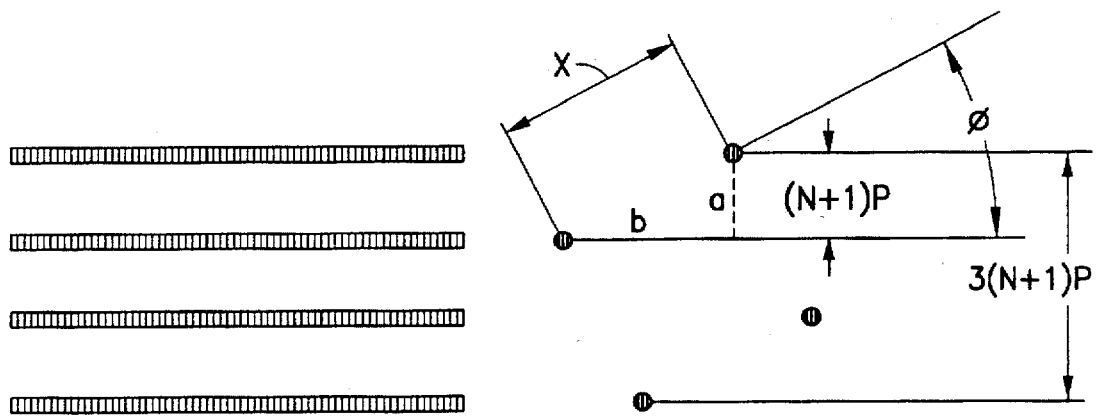
FIG. 8 is a schematic of four laser beams, showing the arrangement thereof to enable concurrent scanning in accord with the invention.

In FIG. 8, a 4 beam system is illustrated. In the system shown in FIG. 8, the distances between the laser beams and the spacing thereof can be determined as follows:

$a=(n+1)p=5p$ $b=2(n+1)p=10p$ (geometric similarity of rotated square)

$a^2+b^2=x^2$ $(5p)^2+(10p)^2=(xp)^2$ (right triangle relationship)

Leaving the p term out to get the relative spacing, 25+100= 125 and the square root of 125 is 11.18034 times the desired dot pitch. The angle $\phi$ is the arctangent of 5/10 or 26.56505°.

Figure 9:
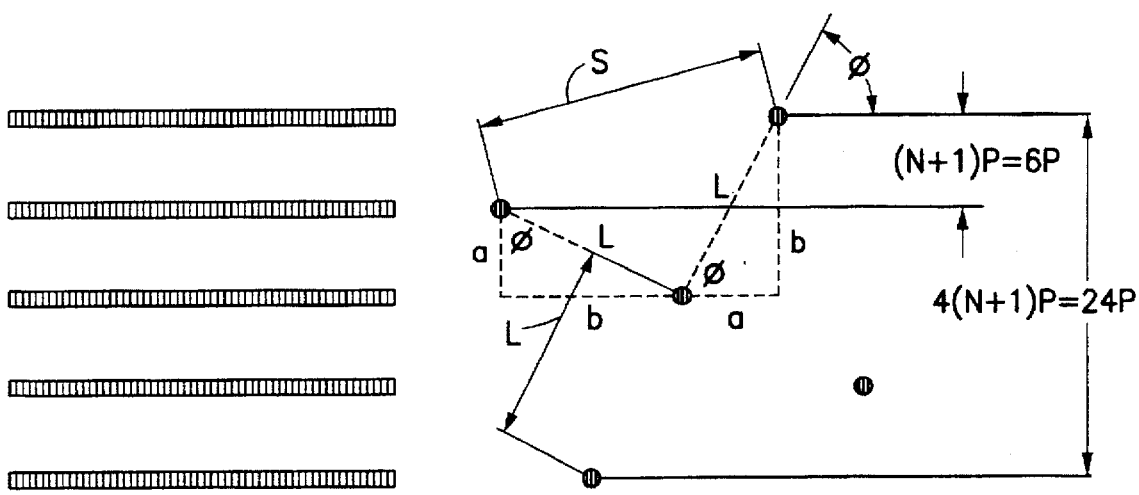
FIG. 9 is a schematic of five laser beams, showing the arrangement thereof to enable concurrent scanning in accord with the invention.

In FIG. 9, a 5 beam system is illustrated and shows the relative spacings between each of the respective laser beams. The distances between the laser beams are determined as follows:

For a given L, Lcos $\phi$=a and Lsin $\phi$=b. In order to have a fixed pitch, b=2a and it follows that Lsin $\phi$=b=2a=2(Lcos $\phi$)

or

Lsin $\phi$=2(Lcos $\phi$)

now sin $\phi$/cos $\phi$=2 or tan $\phi$=2

$\phi$=63.43494882 . . . .

Since for a 5 beam array, the beam spacing must be (n+1)p, then 6p replaces the term for "a" above. L can be calculated from:

Lsin $\phi$=b=2a, or Lcos $\phi$=a now: L=acos $\phi$=6p/cos $\phi$ and: L=(p)13.416408 . . . .

Calculation of S is unnecessary, but it is $S^2=L^2+L^2$ $S=(p)18.97366\ldots$

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A laser printer for producing a raster image comprising plural raster scan lines of pixels, each raster scan line separated from an adjacent raster scan line by a pitch distance p, said printer comprising:

a movable photoreceptor;

n laser source means, where $n \geq 2$, for producing n optical beams which, when incident on said photoreceptor, are separated by a distance of (n+1)p in a direction of movement of said photoreceptor;

motive means for moving said photoreceptor with respect to said optical beams;

scan means for scanning said n optical beams in parallel paths across said photoreceptor;

image buffer memory means for storing plural raster scan lines of pixel values comprising an image;

control means for modulating said n optical beams, respectively, with pixel values from one set of n raster scan lines from said image buffer memory means as said n optical beams are scanned across said photoreceptor, each of said n raster scan lines of said one set separated by a distance of (n+1)p on said photoreceptor, said control means further causing said motive means to move said photoreceptor by a distance (n×p) prior to a start of each scan action of said scan means and to again modulate said n optical beams with pixel values from another set of n raster scan lines that are, respectively, (n+1)p distant from said n raster scan lines of said one set.

2. The laser printer as recited in claim 1, wherein said n laser source means include n laser diodes, said n laser diodes positioned to emit laser beams that are separated by a distance (n+1)p along the direction of movement of said photoreceptor.

3. The laser printer as recited in claim 2, wherein said control means includes means for selectively allocating raster scan line data to modulate said n laser diodes.

4. The laser printer as recited in claim 1, wherein n is an integer in a range of from two to five.

5. A method for controlling a laser printer to produce a raster image comprising plural raster scan lines of pixels, each raster scan line separated from an adjacent raster scan line by a pitch distance p, said printer including a movable photoreceptor, n laser source means, where $n \geq 2$, for producing n optical beams which, when incident on said photoreceptor, are separated by a distance of (n+1)p in a direction of movement of said photoreceptor, scan means for scanning said optical beams in parallel paths across said photoreceptor and image buffer memory means for storing plural raster scan lines of pixel values comprising an image, said method comprising the steps of:

a. scanning said n optical beams across said photoreceptor while modulating said n optical beams, respectively, with pixel values from one set of n raster scan lines from said image buffer means, each of said n raster scan lines of said one set separated by a distance of (n+1)p when said image is transferred to a media sheet;

b. moving said photoreceptor by a distance (n×p) at an end of each scan of said n optical beams;

c. modulating said n optical beams with pixel values from another set of n raster scan lines that are, respectively, (n+1)p distant from said n raster scan lines of said one set; and d. repeating steps a–c until said photoreceptor has been exposed in accordance with all pixel values of said image.

* * * * *